US006148346A

United States Patent [19]
Hanson

[11] Patent Number: 6,148,346
[45] Date of Patent: Nov. 14, 2000

[54] DYNAMIC DEVICE DRIVER

[75] Inventor: Gordon L. Hanson, Kent, Wash.

[73] Assignee: Peerless Systems Imaging Products, Inc., Covington, Wash.

[21] Appl. No.: 08/667,026

[22] Filed: Jun. 20, 1996

[51] Int. Cl.[7] .............................. G06F 9/00; G06F 9/46; G06F 15/163

[52] U.S. Cl. .......................................... 709/321; 345/961

[58] Field of Search ...................................... 395/681, 682, 395/239, 326, 112, 604, 114, 707; 364/948.22, 948.21, 481; 345/961; 707/10; 709/310–332

[56] References Cited

U.S. PATENT DOCUMENTS

| | | | |
|---|---|---|---|
| 5,182,806 | 1/1993 | McKeeman et al. | 395/707 |
| 5,228,118 | 7/1993 | Sasaki | 395/112 |
| 5,432,705 | 7/1995 | Severt et al. | 364/481 |
| 5,533,174 | 7/1996 | Flower, Jr. et al. | 395/114 |
| 5,564,050 | 10/1996 | Barber et al. | 395/604 |
| 5,566,278 | 10/1996 | Patel et al. | 395/114 |
| 5,619,640 | 4/1997 | Tezuka et al. | 395/326 |
| 5,621,789 | 4/1997 | McCalmont et al. | 379/265 |
| 5,699,493 | 12/1997 | Davidson, Jr. et al. | 395/114 |
| 5,706,502 | 1/1998 | Foley et al. | 707/10 |
| 5,720,015 | 2/1998 | Martin et al. | 395/114 |

OTHER PUBLICATIONS

Tektronix PhaseLink Software:Web–Powered Print Administration Support, Jan. 8, 1996 (1page).
"PhaserLink Demo", undated (27 pages).
Tektronix Phaselink software leverages runaway popularity of WWW, PR Newswirem Jan. 8, 1996.
HDE Inc. "Introductory Material", 1996, (10 pages).
The Hard Copy Observer, "PDP, Colorus, and HDE tackle printing on the Web", Mar. 1996, (2 pages).
The Hard Copy Observer", HP and Tel tackle the potential and pitfalls of the Web", Jan. 1996, (3 pages).
PhaserLink Software :Easy access to your printer's information, Jan. 8, 1996.
Xerox Sets Direction for Internet Web–BASGD Printing PR Newswire Jun. 18, 1996.
Ruediger R. Asche, "The Little Device Driver Writer" MSDN Library, Feb. 25, 1994, pp. 1–26.

*Primary Examiner*—Alvin E. Oberley
*Assistant Examiner*—P. G. Caldwell
*Attorney, Agent, or Firm*—Blakely Sokoloff Taylor & Zafman

[57] ABSTRACT

A data communication system for allowing communication between various devices and various operating systems across various types of networking systems. The data communication system includes an host computer system 10 with a display device 15 and a processor 17 for generating signals for the display device, at least one peripheral device 56, and a dynamic device driver 42 for allowing two-way communication between the peripheral device and the host computer system. The dynamic device driver includes an operating system specific portion 33, configured for the operating system of the host computer system, and an operating system independent device driver portion 34, configured for the peripheral device. The operating system includes a linking mechanism 19 for allowing two-way communication between the operating system specific portion and the operating system independent device driver portion, thus allowing two-way communication between the processor and the peripheral device.

32 Claims, 12 Drawing Sheets

Printers Available On This LAN

1. Printer Named: HDE/Meister
   Manufacturer/Model: Ricoh C4FM
   - ☐ Emulations: PostScript® & PCL
   - ☐ Resolutions: 400 DPI
   - ☐ Print Speed: 24 PPM
   - ☐ Paper Sizes: Letter, A4, Executive, B5, Legal, Ledger
   - ☐ Envelope Sizes: Monarch, Commercial-10, DL, C5
   - ☐ Image Enhancement Technology: Sharp Edge Technology
   - ☐ Additional Features: 500 Sheet Input Bin; Digital Scanner; 3 Input Trays; Manual Feed; 15 bin output sorter; Job Seperator Available; PCL Job Timeout.
   - ☐ Comments:

2. Printer Named: HDE/Gerry
   Manufacturer/Model: NEC Silentwriter SuperScript 610
   - ☐ Emulations: PCL & GDI
   - ☐ Resolutions: 300 DPI
   - ☐ Print Speed: 6 PPM
   - ☐ Paper Sizes: Letter, A4, Executive, B5, Legal
   - ☐ Envelope Sizes: Monarch, Commercial-10, DL, C5
   - ☐ Duplexing: Not Available
   - ☐ Image Enhancement Technology: Sharp Edge Technology
   - ☐ Comments: This is a low capacity printer which should be used only for Small jobs.

FIG. 5

**Emulation Selection Menu
For Printer Named: HDE/Meister**

**Hewlett-Packard® PCL® Options Menu
For Printer Named: HDE/Meister**

**Adobe® Acrobat® Options Menu
For Printer Named: HDE/Meister**

**Adobe® PostScript® Options Menu
For Printer Named: HDE/Meister**

Peripheral
Data Object     Printer Setup Options
For Printer Named: HDE/Meister
/76

| Paper Source:<br>Tray 1<br>MP Feeder<br>Manual Feed | Paper Size:<br>8.5 x 11 | Paper Group:<br>US<br>International | Jam Recovery:<br>Disabled<br>Enabled |
|---|---|---|---|
| Paper Reserve:<br>Disabled<br>Enabled | MP Feeder Orientation:<br>Long Edge Feed<br>Short Edge Feed | Paper Thickness:<br>Normal<br>Thick | Manual Feed Timeout:<br>Seconds |

Password:

FIG. 7

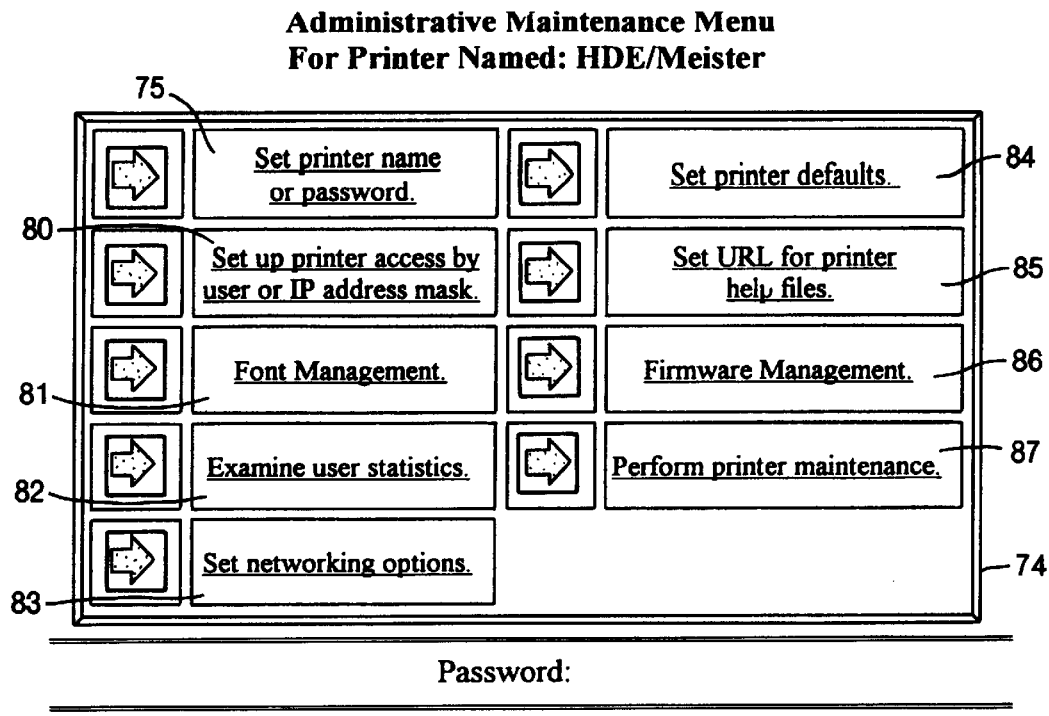
FIG. 8A
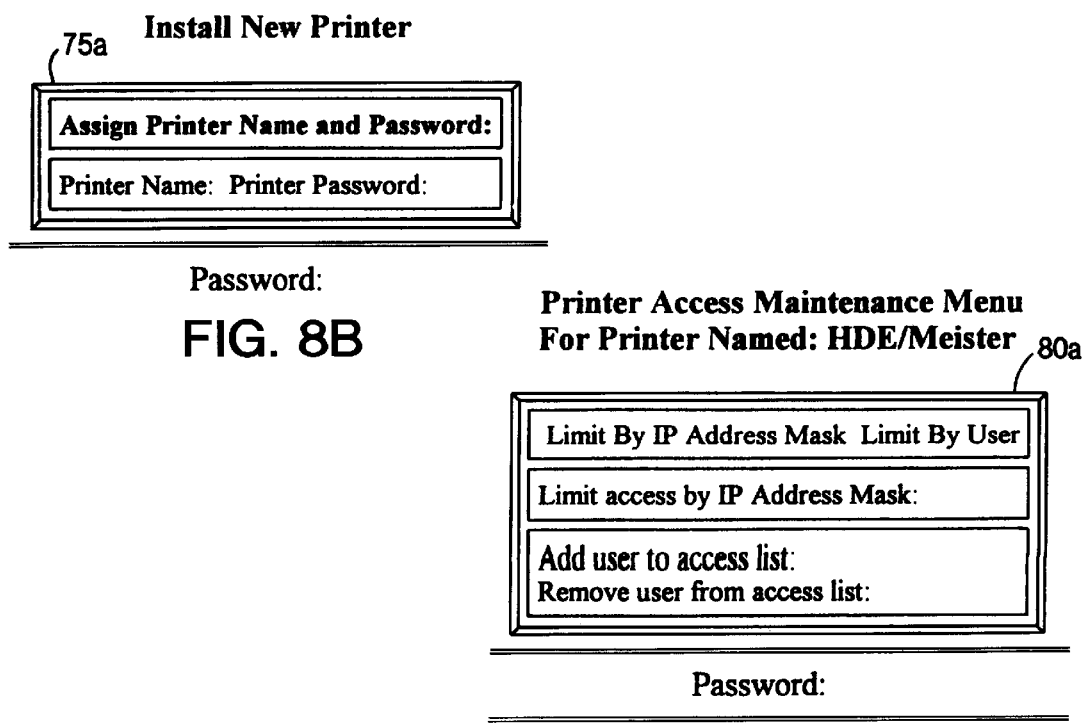
FIG. 8B
FIG. 8C

**Font Management Menu
For Printer Named: HDE/Meister**

```
┌─────────────────────────────────────┐ ─ 81a
│      Display Installed Fonts:       │
│ Select font server to display:      │
│ Password:                           │ ─ 81b
├─────────────────────────────────────┤
│         Installing Fonts:           │
│                                     │
│ Install New font to:                │ ─ 81c
│ New Font:                           │
│ Password:                           │
├─────────────────────────────────────┤
│ Add or delete secondary font servers:│ ─ 81d
│                                     │
│ Add Secondary Font Server URL:      │
│ Remove Secondary Font Server URL:   │
│ Password:                           │
└─────────────────────────────────────┘
```

FIG. 8D

**User Statistics
For Printer Named: HDE/Meister**

| Tom   | 43 Pages  |
|-------|-----------|
| Tom   | 43 Pages  |
| Tom   | 43 Pages  |
| Dick  | 76 Pages  |
| Harry | 180 Pages |
| Linda | 22 Pages  |
| Betty | 66 Pages  |
| Laura | 829 Pages |
| Mary  | 97 Pages  |
| Jim   | 201 Pages |

**Network Options Menu
For Printer Named: HDE/Meister**

```
┌─────────────────────────────────┐
│  Configure Proxy Connection:    │
│         No Proxy                │
│         Install Proxy           │
├─────────────────────────────────┤ ─ 83a
│ Proxy Server Data:              │
│ HTTP Proxy: URL: Port:          │
│ FTP Proxy: URL: Port:           │
└─────────────────────────────────┘
```

Password:

FIG. 8F

Printer Defaults Setup
For Printer Named: HDE/Meister

— 84b

| Paper Handling Options | | | |
|---|---|---|---|
| Default Paper Size: | Default Paper Source:<br>Tray 1<br>MP Feeder<br>Manual Feed | Default Paper Group:<br>US<br>International | Jam Recovery:<br>Disabled<br>Enabled |
| Paper Reserve:<br>Disabled<br>Enabled | MP Feeder Orientation:<br>Long Edge Feed<br>Short Edge Feed | Paper Thickness:<br>Normal<br>Thick | Manual Feed Timeout:<br>Seconds |
| Global Printer Parameters | | | |
| Default Emulation:<br>Adobe PostScript®<br>Microsoft Windows®<br>Printing System<br>Hewlett-Packard PCL®<br>HyperText Markup Language | Start Page:<br>On<br>Off | Disk Font Caching:<br>On<br>Off | Power Saver:<br>On<br>Off |
| Imaging Options | | | |
| Orientation:<br>Portrait<br>Landscape | Scaling: % | Resolution:<br>600 DPI<br>300 DPI | Edge Smoothing:<br>On<br>Off |

84a, 84c, 84d

Password:

FIG. 8G

Help Files Setup
For Printer Named: HDE/Meister

— 85a

| Set primary URL to help files: |
|---|
| Primary Help File URL:<br>Secondary Help File URL: |

Password:

FIG. 8H

Printer Firmware Maintenance Menu
For Printer Named: HDE/Meister

| Display Firmware Revision: |
|---|
| Password: |
| Download new firmware: |
| Updated Firmware URL: |
| Password: |

Printer Maintenance Menu
For Printer Named: HDE/Meister

| Execute Printer Diagnostic |
|---|
| Password: |

| Expendables Condition | Covers/Doors |
|---|---|
| ☐ Cyan Toner: OK<br>☐ Magenta Toner: OK<br>☐ Yellow Toner: OK<br>☐ Black Toner: OK<br>☐ Waste Toner Box: FULL<br>☐ Fuser oil: OK | ☐ Manual Feed Door: Closed<br>☐ Front Engine Access: Closed<br>☐ Rear Engine Access: Closed<br>☐ Toner Cartridge Cover: Closed<br>☐ Waste Toner Box Cover: Closed |
| Engine/Fuser | Paper Jams |
| ☐ Total Engine Pages: 25629<br>☐ Total Fuser Pages: 25629 | ☐ Cassette: No<br>☐ Drum: No<br>☐ Fuser: No<br>☐ Ejector: No |

DYNAMIC DEVICE DRIVER

FIELD OF THE INVENTION

This invention relates to the field of data processing and, more particularly, to an improved dynamic device driver that provides communication between various devices and various operating systems across various types of networking systems.

BACKGROUND OF THE INVENTION

Device drivers are programs or routines which control and manage the flow of data to and from input/output (I/O) devices. The drivers form part of and interact with an operating system. An operating system normally includes a basic set of device drivers for I/O devices, such as a keyboard, fixed and floppy disk drives, display, and printer, commonly used with a personal computer. When an I/O device is added to a data processing system, and such device is not operable under an existing driver stored within the data processing system, a new driver must be added to the system in order to use the device. A new driver is customarily supplied by the maker of the I/O device and is installed in the system in accordance with procedures established by the operating system. In personal computers operating with DOS™ or OS/2™ operating systems, such drivers are installed at start or reboot time, using commands or instructions in a CONFIG.SYS file.

Typically device drivers are created for use with a particular operating system. A device driver written for one operating system cannot be used with another operating system without extensive modifications. Many have tried to find solutions to this dependency problem in order to create a universal device driver. One example is U.S. Pat. No. 5,265,252 to Rawson, III et al., which discloses a device driver, with one part that interfaces with the operating system and a second part that interfaces with the plurality of different operating systems. Rawson's device driver system handles a great variety of different I/O devices with different operating systems. Another example is U.S. Pat. No. 4,975,829 to Clarey et al. Clarey et al. also discloses a device driver that is independent of a computer operating system for communication with peripheral device jobs.

The prior art, as noted above, exhibits an apparent universal connectivity feature with operating systems and peripheral devices whose protocols are preprogrammed into the device driver. However, these device drivers are activated at compile time and thus cannot interact with operating systems or device drivers not previously conceived of during the authoring of the initial device driver. Thus, the systems fail to be truly independent. Also, the prior art fails to address a significant amount of user friendly two-way communication between the operating system and the connected peripheral devices.

Recently, Tektronix and others are linking peripherals to the Internet by writing Hyper-Text Mark Up Language (HTML) software for the peripheral. HTML allows for two-way communication between a connected host and the peripheral. However, the host must include the device driver software to operate with the peripheral. For example, if a user were to print an MS Word document to a printer identified by an addressed site on the Internet or similar type network, the user must first send the document through the device driver associated with this printer. Then the user must utilize a send document function, such as a File Transfer Protocol (FTP) procedure, to efficiently deliver the document to the printer.

As will be readily appreciated from the foregoing summary, the invention provides a dynamic device driver for providing two way communication between a computer operating system and a connected peripheral device at run time.

SUMMARY OF THE INVENTION

The present invention provides a dynamic device driver system that provides two-way communication between various peripheral devices and various operating systems coupled across various types of networking systems. The host computer system controls a peripheral device coupled to a host computer system having an operating system with a translation layer and a processor, wherein the peripheral device has an associated peripheral device driver and the host computer system is coupled to the peripheral device via a connection selected from the group of a direct connection, local area network connection and public data network connection. The host computer system assigns an address to the peripheral device to distinctly identify the peripheral device to the host computer system and selects the peripheral device according to the assigned address. Also the host computer system retrieves the stored peripheral device driver of the selected peripheral device, interprets the retrieved peripheral device driver and controls the peripheral device according to user initiated controlling commands in the operating system through the translation layer to the interpreted peripheral device driver.

In accordance with still other aspects of the present invention, the host computer system compiles the peripheral device driver instead of interpreting the peripheral device driver, wherein the compiling performed is just-in-time compiling that maintains processor and operating system independence for the peripheral device driver.

In accordance with still other aspects of the present invention, the host computer system retrieves the peripheral device driver from a stored location in the host computer system, the peripheral device or an independent server.

In accordance with yet other aspects of the present invention, the peripheral device is a printer, a scanner, a high density storage medium, a facsimile device, and home appliances such as audio/video components and display devices.

In accordance with still yet other aspects of the present invention, the peripheral device driver includes a graphical user interface (GUI) for entering of user initiated controlling commands. The GUI of the peripheral device driver displays the status of the peripheral device and a list of predefined user-selectable options for the selected peripheral device In accordance with further aspects of the present invention, the peripheral device driver displays an administrative maintenance menu, wherein the administrative maintenance menu allows a user to perform at least one of the following functions: connect additional peripheral devices; limit user access to specific peripheral devices; install fonts from various predefined font servers connected to the operating system; install a proxy connection; display the most recent users of the selected peripheral device and predetermined details of the most recent user peripheral device episodes; set default peripheral device handling options; set default global peripheral device parameter options and set default imaging options.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein:

FIGS. 3–8 are interactive menus of the present invention; and

DETAILED DESCRIPTION OF THE PREFERRED EMBODIMENT

Figure 1:
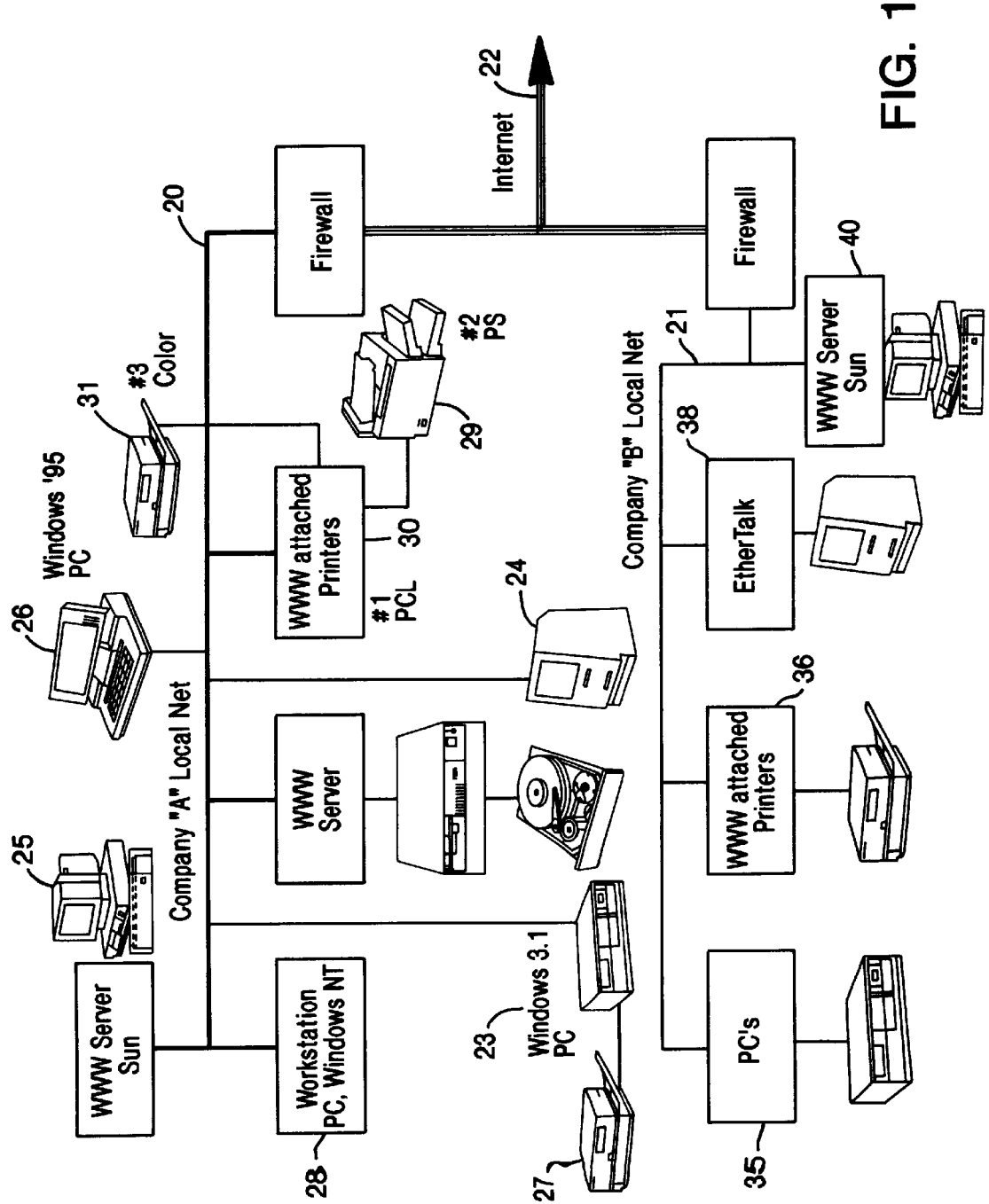
FIG. 1 is a pictorial of some system and network connections possible with the present invention.

As will be better understood from the following description, the present invention is directed to a system for dynamically connecting any peripheral devices to any host computer system, wherein virtually any electronically controllable peripheral device equipped with the necessary interface can be connected. While the following description explains the invention in connection with printers, it is to be understood that the invention can be used with other peripheral devices. In addition, the invention easily accommodates peripheral devices and host computer systems produced by various manufacturers. The invention employs a host computer system, a network, interfaces for connecting the computer and the peripheral devices to the network, and a dynamic device driver with an operating system (OS) independent device driver portion and an OS specific device driver portion.

As described previously, the prior art allows for file transfer protocol sending or FTPing of various documents, such as Excel, Word, MacWrite, etc., to a peripheral device for execution. However, the document must be correctly formatted by a device driver specific to the peripheral device. In the preferred embodiment of the present invention, the dynamic device driver uses the fundamental aspects of an object oriented language, such as Java™ computer language, to provide for a dynamic connection of peripheral devices.

The fundamental aspects of object-oriented programming language are that objects are organized into classes in a hierarchical fashion and that objects are interoperable. Classes are abstract generic descriptions of objects and their behaviors. A class defines a certain category or grouping of methods and data within an object. Methods comprise procedures or code that operate upon data. Methods as applied to data define the behavior of the object. Refinement of the methods of the class is achieved by the creation of "sub-classes." In other words, a class can be thought of as a genus, and its subclass as the species. Subclasses allow the introduction of a new class into the class hierarchy, and inherit the behaviors of its superclass while adding new behaviors to the subclass.

An instance of a class is a specific individual entity, something concrete having observable behavior. An instance is a specific object with the behaviors defined by its class. Instances are created and deleted dynamically in an object-oriented programming language. The class, however, is the broad, yet abstract, concept under which the instance belongs. The instance inherits all the methods of its class, but has particular individual values associated with it that are unique. There is only one location in the memory of a computer for the class. There may, however, be numerous instances of the class, each of which has different values and different physical locations in memory.

Object-oriented programs have greatly increased the operability of applications, such as Pagemaker™, running on an OS. However, applications typically considered part of the OS have not displayed a requirement or need to use object-oriented programming. An example of an application considered part of the OS is a device driver. The present invention incorporates object oriented programs to create a single device driver that provides communication between any host computer system and any peripheral device.

FIG. 1 illustrates the environment in which the present invention operates. Components of the dynamic device driver 42 are located on each of the components illustrated in FIG. 1. Thus, each operating system can effectively communicate with peripherals connected locally or remotely. For example, if a user is operating from a Windows 3.1 PC 23, the dynamic device driver 42 allows communication with peripherals directly attached, such as a printer 27, peripherals connected on an intranet network 20, such as printers 29–31, or peripherals connected on the Internet 22, such as printer 36.

Figure 2:
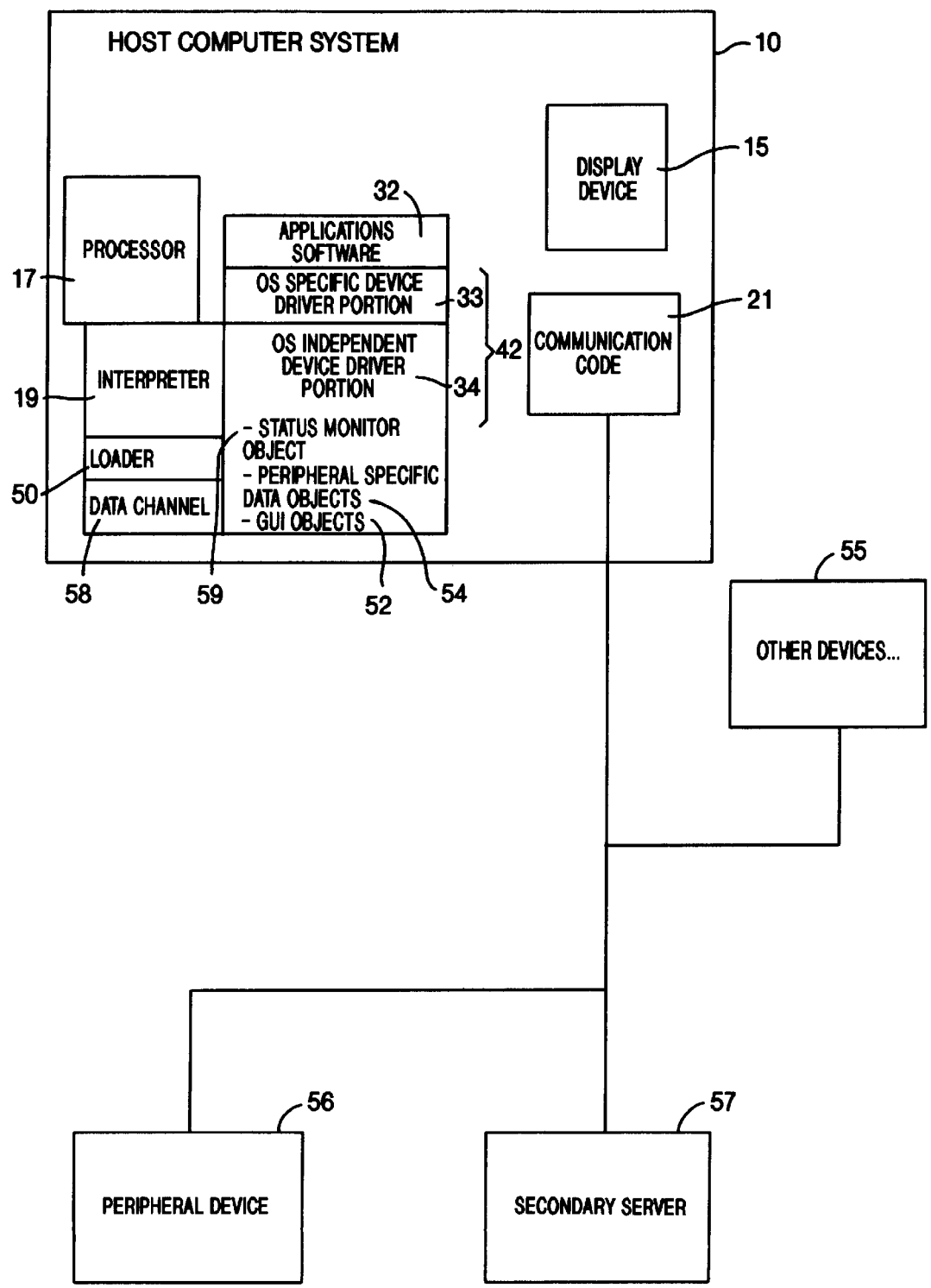
FIG. 2 is a block diagram of the system components of the present invention.

FIG. 2 illustrates the basic components of a dynamic device driver 42 and the environment in which it resides. Driver 42 includes two components: an OS specific device driver portion 33; and an OS independent device driver portion 34. The OS specific device driver portion 33 is written specifically for the OS of a host computer system 10 in which it resides. An OS specific device driver portion written for a Windows 95™ operating system is significantly different than an OS specific device driver portion written for a Macintosh or Sun operating system. The host computer system 10 also includes a display device 15, a processor 17, communication code 21 for linking the host computer system 10 to any connected network, an interpreter 19, an OS independent device driver portion loader 50 and applications software 32 such as Word or Excel.

The OS specific device driver portion 33 is the two-way translating communication layer between the OS of the host computer system 10 and the OS independent device driver portion 34. The OS independent device, driver portion 34 resides either in the host computer system 10, in the peripheral device that it is specific to (such as peripheral device 56), or in an independent server connected either directly to the host computer system 10 (such as secondary server 57) or indirectly through a local area network, such as an intranet, or a public data network, such as the Internet. The OS independent device driver portion 34 includes information regarding peripheral device operation, peripheral specific data objects 54 and may include graphical user interface (GUI) objects 52. The peripheral specific data objects 54 are associated with a particular peripheral device and include information relating to the particular peripheral device. For example, if the peripheral device is a printer, the peripheral specific data objects 54 include information about the printer's paper trays, the printer's formatting requirements, etc. The GUI objects 52 provide the user a way to view and manipulate the peripheral specific data objects 54.

When the OS independent device driver portion 34 is written in the Java language, as multiple Java applets (small independent Java language programs), the host computer system 10 must include a Java applet loader 50, a Java data channel 58 and a Java interpreter 19. The interpreter 19 is a virtual machine or CPU for the Java applets, thus allowing run time execution of the OS independent device driver portion 34 on the host computer system 10. The interpreter 19 also provides processor independence for any OS independent device driver written in interpreted code. The OS specific device driver portion 33 provides for communication between the OS of host computer system 10 and the executing OS independent device driver portion 34. It can be appreciated by one of ordinary skill that an object oriented language with similar characteristics as Java may be used in the present invention provided the object oriented language includes OS independent code with the device driver information required for the peripheral device for multi-network access and OS specific code for translating between the OS and the OS independent code. It can also be appreciated that a just-in-time compiler could replace the interpreter 19 to compile interpreted code into machine specific code.

FIGS. 3–8 illustrate examples of displayed menus of GUI objects 52 that include printer specific objects 54. Another embodiment, not shown, incorporates the GUI objects 52 into the menus of the application software 32 running on the operating system. For example, a printer options window of the common command windows for Word 6.0 of a printer connected to the host computer system through a standard device driver and a printer connected to the host through the dynamic device driver 42 would be visually the same and may include similar printer options.

Figure 3:
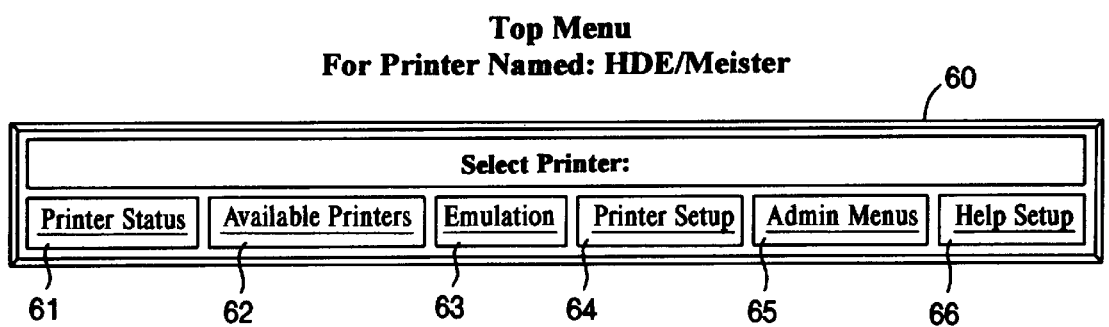
Figure 4:
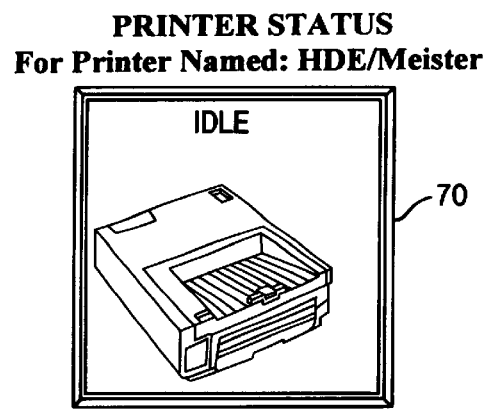

The menus of FIGS. 3–8 illustrate either printer set up information, menu item selections or status information of the printer. FIG. 3 illustrates a top menu 60 that allows the user to interact with the preconnected printer. The top menu 60 is an example of a GUI object that provides six different selectable buttons: "printer status" 61; "available printers" 62; "emulation" 63; "printer set up" 64; "admin menus" 65; and "help set up" 66. Each selection links to a separate menu. The menus may be written in either HTML and Java or just Java, depending on user requirements and the type of data fetched from the peripheral device. Referring to FIG. 4, the selection of "printer status" 61 displays the connected printer's current status 70, such as printer idle, needs paper, paper jam, etc. FIG. 4 is an example of a status monitor object 59. Referring to FIG. 5, the selection of "available printers" 62 displays a GUI object list of available printers accessible through direct or network connection. A list of features for each of the printers is provided to help the user select which printer to use. The list of features include printer emulation, resolution, print speed, paper and envelope sizes, comments or additional printer features.

Figure 6A:
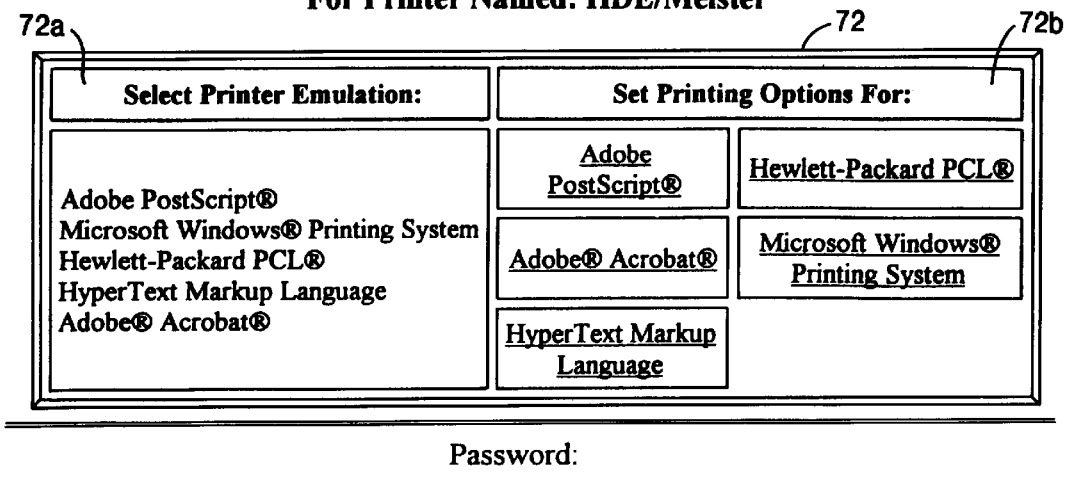
Figure 6B:
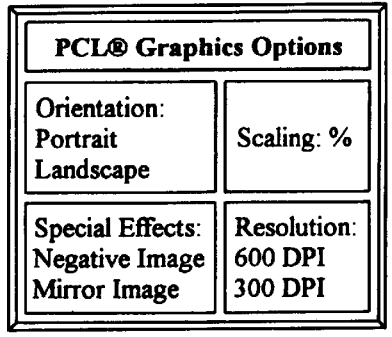
Figure 6C:
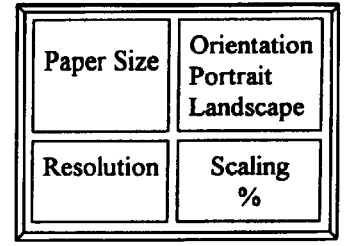
Figure 6D:
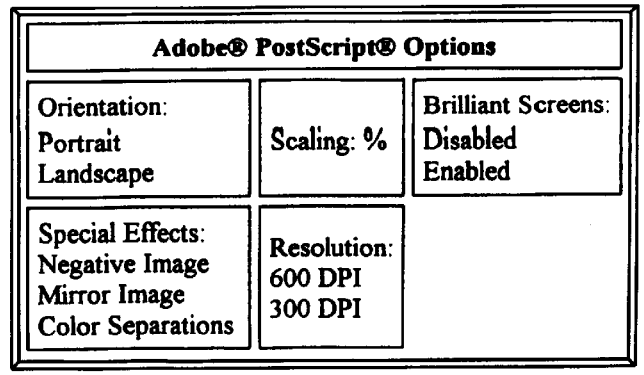

FIGS. 6A–D illustrate displays associated with the third selectable button, "emulation" 63. An emulation selection menu 72 allows a user to set up various options for each emulation available for the printer. The emulation selection menu 72 provides printer emulation section 72a and printer options section 72b within an emulation. The printer emulation section 72a allows the user to choose the printer emulation desired for use on the selected printer. Printer options section 72b allows the user to personalize the options available for each emulation. For example, as shown in FIG. 6C, paper size, print orientation, print resolution and scaling are four personalized options available under the ADOBE™ Acrobat™ emulation option available for HDE/Meister printer identified. Each window in FIGURES A–D is an example of a GUI object 52 with included peripheral specific data object 54 representing the printer values displayed with the windows.

Referring to FIG. 7, the printer set up menu 76, activated by selection of the "printer setup" button 64, allows a user to change and verify printer settings. The user can select the paper source to use (upper tray, lower tray, manual feed, etc.), the paper size to print on, the paper group, the jam recovery feature, the paper reserve feature, the paper feeder orientation, the paper thickness and the manual feed timeout.

For example, the user selects the US paper group with a normal size selection, an automatic tray 1 selection due to the paper size selection, a disable feature of the jam recovery and paper reserve, a short edge feed of manual paper feeder orientation, a normal thickness on the paper and a time of twenty seconds for the manual feed timeout. Printer set up menu 76 is also a GUI object 52 with included peripheral specific data objects 54. The paper size value data displayed is an example of a peripheral specific data object 54.

FIG. 8A illustrates an administrative maintenance menu 74 displayed upon selection of the "admin menus" button 65. Presently, the administrative maintenance menu 74 includes nine selectable buttons that allow the user to interact with various features of the GUI of the present invention. Administrative maintenance menu 74 includes a "set printer name or password" button 75 that provides for installation of a new printer on the network in an install new printer menu 75a, see FIG. 8B. In the install new printer menu 75a, a user assigns a printer by entering the address that identifies the printer. Also, if printer access is to be password protected, the system administrator can assign a password to menu 76a. FIGS. 8B–8J are examples of GUI objects 52 with peripheral specific data objects 54.

FIG. 8C illustrates a printer access maintenance menu 80a accessed through selection of button 80 of the administrative maintenance menu 74. A system administrator using the printer access maintenance menu 80a can limit or expand printer access by changing accessible user address or can add or remove users from an existing access list.

FIG. 8D illustrates a font management menu 81a accessed through the selection of "font management" button 81 of the administrative maintenance menu 74. The font management menu 81a includes three sections: a display installed fonts section 81b; an installing fonts section 81c; and an add or delete secondary font server section 81d. The display installed fonts section 81b displays a list of fonts available to the selected printer. The fonts may be stored on and accessed from the host computer system 10, a printer connected locally, or a remote server 57. The installing fonts section 81c allows installation of new fonts on a particular font server. Add or delete secondary font servers section 81d allows the addition or removal of font server URLs to a list of secondary font servers. Password access is available for each section of the font management menu 81a.

FIG. 8E illustrates recent user statistics display 82a of the printer accessed through the "examine user statistics" button 82 of the administrative maintenance menu 74. The user statistics display 82a of the present invention illustrates the name of the person and pages printed in the last ten episodes performed on the printer. Other information relating to previous episodes may also be displayed.

FIG. 8F illustrates a network option menu 83a selectable through the "set networking options" button 83 of the administrative maintenance menu 74. In the network option menu 83a, the administrator can assign a proxy server on networks which have a gateway to the Internet and the firewall of the administrator's network. With a firewall installed, there is a need to assign a server which will act as a proxy on the outside of the firewall. The proxy server will handle requests and/or data destined for machines located inside the firewall.

FIG. 8G illustrates a menu 74 that is accessed through selection of "set printer defaults" button 84 of the administrative maintenance menu 74. The menu 74 includes three subsections with multiple options: paper handling options 84b; global printer parameters 84c; and imaging options 84d. The paper handling options 84b allow the user to set defaults of printer options. The global printer parameters 84c allow a user to set the default of the printer emulation, a start page option, a disk font caching option and a power saver option. Selecting on for the start page option causes the printer to print a start page for every print job. Selecting on for the disk font caching option causes the printer to cache fonts internally which may improve throughput but is dependent upon the amount of RAM available to the printer. Enabling the power saver option allows the printer to enter a reduced power consumption mode after standing idle for a specific period of time. The imaging options 84d allow the user to set certain imaging characteristics for the printer. In the imaging options 84d, the user can orient the image portrait or landscape, set the default scan of the image and set the available range for scaling in images, for example between 20% to 300%. Dots per inch (DPI) is also a user definable option under the imaging options 84d. The final default option under the imaging options 84d is edge smoothing for enabling a desired edge smoothing characteristic. The available options listed in the printer default set up of FIG. 10G are for the specific preselected printer, HDE/Meister. It can be appreciated by one of ordinary skill in the art that one or more of the default settings may be different than that shown according to the make and model of the preselected printer.

FIG. 8H illustrates a help file set up menu 85a accessed upon selection of "set URL for printer help files" button 85 of the administrative maintenance menu 74. The help file set up GUI allows the network administrator to set up a primary and secondary link to the printer's help file. The network administrator is prompted to insert URL codes that access the help files that are in HTML format. The HTML formatted help files may be stored in the printer or remotely from the printer.

Another menu accessed through selection of "firmware management" button 86 of the administrative maintenance menu 74 is the printer firmware maintenance menu 86a, as shown in FIG. 8I. Using the firmware maintenance menu 86a a user can reprogram flash programmable read only memory (PROMS) with a new version of the printer firmware. Also, the latest firmware revision is displayed from the firmware maintenance menu 86a.

A final menu displayed through selection of "perform printer maintenance" button 87 of the administrative maintenance menu 74 is the printer maintenance menu 87a, as shown in FIG. 8J. Through the printer maintenance menu 87a, the system administrator can execute a diagnostic program on the printer and obtain a current status of the printer. Diagnostics relating to toner, covers and door positions, paper jams, etc. can be determined by diagnostics with the results displayed in the printer maintenance menu 87a.

The menus and displays of the preferred embodiment of the present invention, FIGS. 3–8, can be easily modified to incorporate the information required for whatever type of peripheral device desired. The OS specific device driver portion 33 and the OS independent device driver portion 34 can be easily modified to incorporate the information required for different types of peripheral devices, such as CD ROM storage, scanners, facsimile devices, and home appliances such as audio/video components and display devices 55. Also, objects associated with the OS independent device driver portion 34 may vary greatly or may not be necessary depending on the type peripheral device. For example, a status monitor object 59 may be important to a user sending print jobs to a printer, but might be of significant lesser concern to the user sending storage jobs to remote CD ROM storage.

The interaction between a peripheral device 56 and a host computer system 10 which include the dynamic device driver 42 will now be discussed. The operating system of the host computer system 10 is preprogrammed with the location information of desired peripheral devices. The location information could be in a form for identifying the peripheral device directly connected to a port of the host computer system or identifying the peripheral device's network location, such as an Universal Resource Locator (URL) for identifying an intranet or Internet location. The communication code 21 (FIG. 2) receives and sends packets specific to the type of network connected. A user preselects an identified peripheral from menus in the application software 32. For and additional example in Word, if the peripheral device is a printer and the operating system is Windows, the user selects identified printers in a Printer Options menu.

Figure 9:
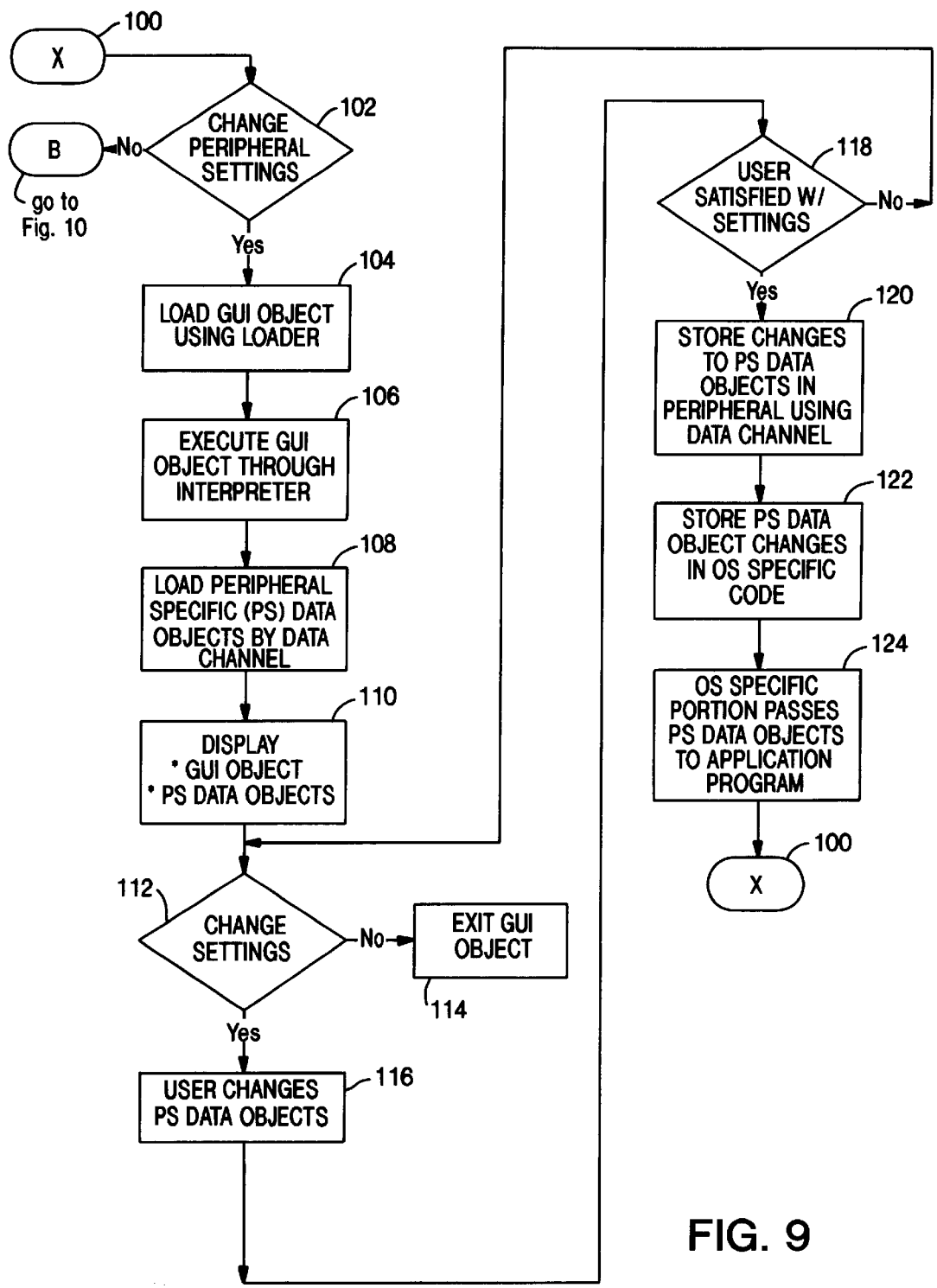
FIGS. 9 and 10 are flow diagrams of data access of the present invention.

With reference now to FIG. 9, if a user chooses to change a setting of the identified peripheral at 102, the loader 50 retrieves the GUI objects 52 from the peripheral device 56 and loads it on the host computer system at 104. The interpreter 19 executes the retrieved and loaded GUI objects at 106. Peripheral specific data objects may be required at different times during execution of the GUI object. The data channel 58 retrieves and loads peripheral specific data objects at 108 when required. The operating system generates a display of the GUI objects and the peripheral specific data objects on display device 15 of the host computer system 10 at 110. The display of the GUI objects and peripheral specific data objects can be designed identical to the GUIs presently used by the application software 32.

The system then allows the user to change settings by selection of various graphically displayed peripheral specific data object options within the GUI objects 52 at 112. If the user decides no changes are necessary, the system exits the GUI objects at 114. However, if the user makes changes at 116, but is dissatisfied with the changes at 118 the user can alter any changes made. If the user is satisfied with the changes, the data channel 58 stores peripheral specific data object changes in the peripheral device 56 at 120 and the peripheral specific data object changes are implemented in OS specific code at 122 by the OS specific portion 33. Lastly, the OS specific portion 33 passes the peripheral specific data object changes implemented in OS specific code to the application software 32.

Figure 10:
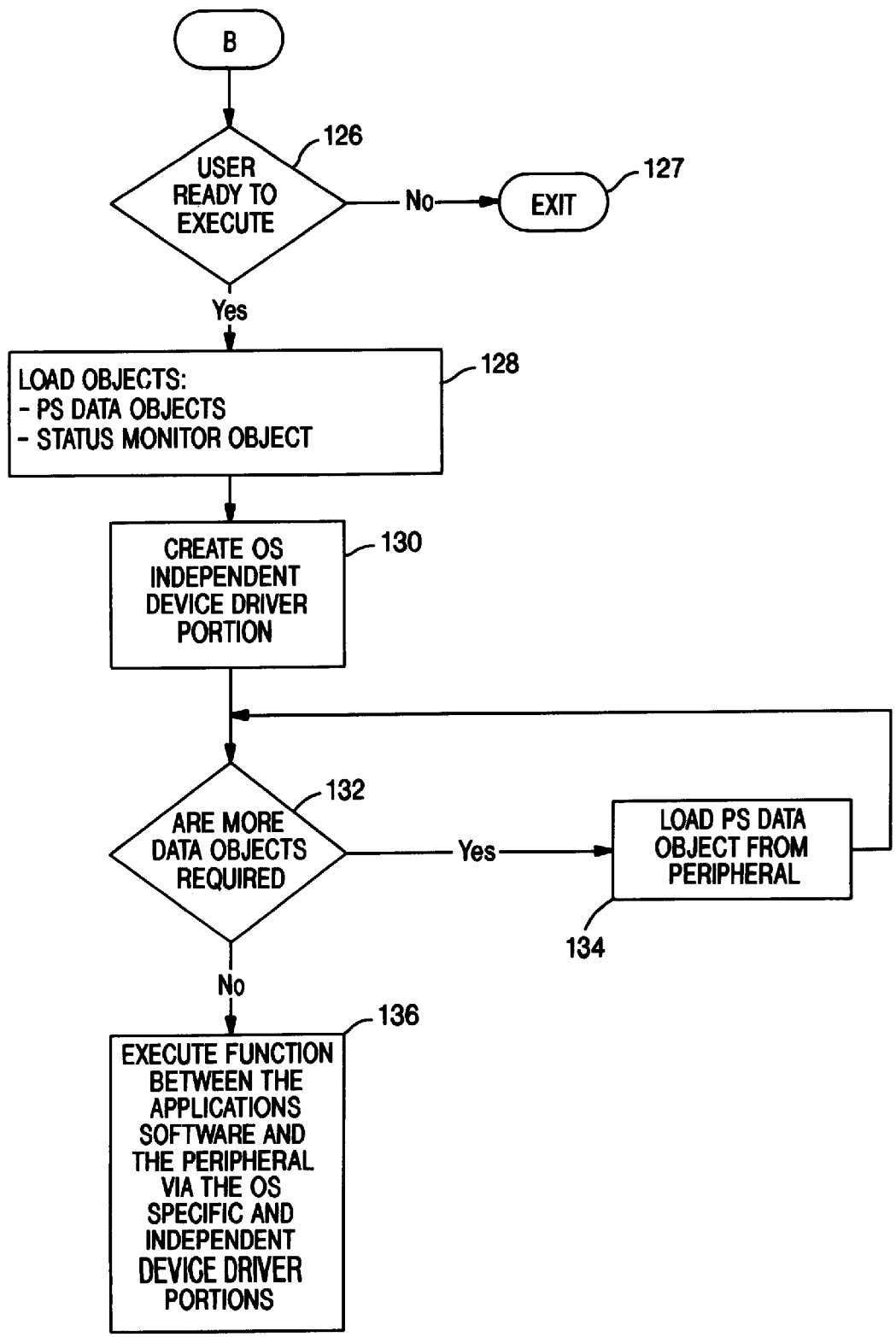

Referring to FIG. 10, once the peripheral specific data objects are set, the peripheral device 56 is set to the user's desires and the system is ready to execute a function with the peripheral device 56 at 126. The user may exit at 127, if the user desires not to continue. If the user selects function execution, the loader 50 retrieves peripheral specific data objects and retrieves the status monitor object if required. The interpreter 19 executes the loader retrieved objects at 130. An executed status monitor object 59 presents real-time information regarding operating status of the peripheral device, such as printer idle, needs paper and paper jam on the display device 15, and may present a pause command for a user defined function hold. If a peripheral specific data object is required during execution at 132, the data channel loads any required peripheral specific data objects not loaded from the peripheral at 134. If a peripheral specific data object is not required, the application software 32 executes the function with the peripheral at 136. Execution of the objects on the interpreter 19 creates the OS independent device driver portion 34. The OS specific device driver portion 33 allows the OS independent device driver portion 34 to communicate with the applications software 32.

While the preferred embodiment of the invention has been illustrated and described, it will be appreciated that various changes can be made therein without departing from the spirit and scope of the invention.

The embodiments of the invention in which an exclusive property or privilege is claimed are defined as follows:

1. A method for controlling peripheral devices coupled to a host computer system having an operating system with a translation layer and a processor, wherein each peripheral device has an associated address and the host computer system is coupled to each peripheral device via a connection selected from the group of a direct connection, a local area network connection, and a public data network connection, said method comprising the steps of:

generating a peripheral device job at the host computer system;

assigning an address of a peripheral device at the host computer system to the generated peripheral device job;

selecting, at the host computer system, a peripheral device coupled to the host computer according to the generated peripheral device job and the assigned address;

retrieving, at the host computer system, at least one peripheral device driver associated with the selected peripheral device according to the generated peripheral device job, wherein the at least one peripheral device driver is noninterpreted computer code that is independent of the host computer system's operating system and processor;

interpreting the retrieved at least one peripheral device driver; and controlling, at the host computer system, the peripheral device according to the interpreted at least one peripheral device driver through user commands initiated in the operating system of the host computer system and filtered through the translation layer.

2. The method of claim 1, wherein the step of retrieving retrieves the peripheral device driver from a stored location in the host computer system.

3. The method of claim 1, wherein the step of retrieving retrieves the peripheral device driver from a stored location in the peripheral device.

4. The method of claim 1, wherein the host computer system is coupled to at least one independent server via a connection selected from the group of a direct connection, local area network connection, and public data network connection and the step of retrieving retrieves the at least one peripheral device driver from a stored location in the at least one independent server.

5. The method of claim 1, wherein the peripheral device is any server equipped device.

6. The method of claim 1, wherein the peripheral device is a printer.

7. The method of claim 1, wherein the peripheral device is a scanner.

8. The method of claim 1, wherein the peripheral device is high density storage.

9. The method of claim 1, wherein the peripheral device is a facsimile device.

10. The method of claim 1, wherein the noninterpreted peripheral device driver is independent of the host computer system's operating system and processor.

11. The method of claim 1, wherein the peripheral device driver includes a graphical user interface (GUI) for entering of user initiated controlling commands.

12. The method of claim 11, wherein the GUI of the peripheral device driver displays the status of the peripheral device.

13. The method of claim 11, wherein the GUI of the peripheral device driver displays a list of predefined user-selectable options for the selected peripheral device.

14. The method of claim 11, wherein the GUI of the peripheral device driver displays an administrative maintenance menu, wherein said administrative maintenance menu allows a user to perform at least one of the following functions:

connect additional peripheral devices; limit user access to specific peripheral devices;

install fonts from various predefined font servers connected to the operating system;

install a proxy connection; display the most recent users of the selected peripheral device and predetermined details of the most recent user peripheral device episodes;

set default peripheral device handling options; set default global peripheral device parameter options and set default imaging options.

15. A system for controlling peripheral devices coupled to a host computer system having an operating system with a translation layer and a processor, wherein each peripheral device has an associated address and the host computer system is coupled to each peripheral device via a connection selected from the group of a direct connection, a local area network connection, and a public data network connection, said system comprising:

a means for generating a peripheral device job at the host computer system;

a means for assigning an address of a peripheral device, at the host computer system, to the generated peripheral device job;

a means for selecting, at the host computer system, a peripheral device coupled to the host computer according to the generated peripheral device job and the assigned address;

a means for retrieving, at the host computer system, at least one peripheral device driver associated with the selected peripheral device according to the generated peripheral device job, wherein the at least one peripheral device driver is noninterpreted computer code that is independent of the host computer system's operating system and processor;

a means for interpreting the retrieved at least one peripheral device driver; and a means for controlling, at the host computer system, the peripheral device according to user initiated controlling commands in the operating system and the interpreted at least one peripheral device driver.

16. The system of claim 15, wherein the means of retrieving retrieves the peripheral device driver from a stored location in the host computer system.

17. The system of claim 15, wherein the means of retrieving retrieves the peripheral device driver from a stored location in the peripheral device.

18. The method of claim 15, wherein the host computer system is coupled to an independent server via a connection selected from the group of a direct connection, local area network connection, and public data network connection and the means of retrieving retrieves the at least one peripheral device driver from a stored location in an independent server.

19. The system of claim 15, wherein the peripheral device is any server equipped device.

20. The system of claim 15, wherein the peripheral device is a printer.

21. The system of claim 15, wherein the peripheral device is a scanner.

22. The system of claim 15, wherein the peripheral device is high density storage.

23. The system of claim 15, wherein the peripheral device is a facsimile device.

24. The system of claim 15, wherein the noninterpreted peripheral device driver are independent of the host computer system's operating system and processor.

25. The system of claim 15, wherein the at least one peripheral device driver includes a graphical user interface (GUI) for entering of user initiated controlling commands.

26. The system of claim 25, wherein the GUI of the peripheral device driver displays the status of the peripheral device.

27. The system of claim 25, wherein the GUI of the peripheral device driver displays a list of predefined user-selectable options for the selected peripheral device.

28. The system of claim 25, wherein the GUI of the peripheral device driver displays an administrative maintenance menu, wherein said administrative maintenance menu allows a user to perform at least one of the following functions:

connect additional peripheral devices; limit user access to specific peripheral devices;

install fonts from various predefined font servers connected to the operating system;

install a proxy connection; display the most recent users of the selected peripheral device and predetermined details of the most recent user peripheral device episodes;

set default peripheral device handling options; set default global peripheral device parameter options and set default imaging options.

29. A method for controlling peripheral devices coupled to a host computer system having an operating system with a translation layer and a processor, wherein each peripheral device has an associated address and the host computer system is coupled to each peripheral device via a connection selected from the group of a direct connection, a local area network connection, and a public data network connection, said method comprising the steps of:

generating a peripheral device job, at the host computer system;

selecting, at the host computer system, a peripheral device coupled to the host computer according to the generated peripheral device job and the associated address;

retrieving, at the host computer system, at least one peripheral device driver associated with the selected peripheral device according to the generated peripheral device job, wherein the at least one peripheral device driver is noncompiled computer code that is independent of the first computer controlled device's operating system and processor;

compiling the retrieved at least one peripheral device driver; and controlling, at the host computer system, the peripheral device according to the compiled at least one peripheral device driver through user commands initiated in the operating system of the host computer system and filtered through the translation layer.

30. The method of claim 29, wherein the step of compiling is performing just-in-time compiling to maintain processor and operating system independence for the peripheral device driver.

31. The method for controlling communication between at least two coupled computer controlled devices having addresses with at least one computer controlled device having an operating system with a translation layer, wherein the computer controlled devices are coupled via a connection selected from the group of a direct connection, a local area network connection, and a public data network connection, said method comprising the steps of:

generating a computer controlled device job at a first computer controlled device;

assigning an address of a second computer controlled device to the generated computer controlled device job;

selecting, at the first computer controlled device, the second computer controlled device according to the assigned address;

retrieving, at the first computer controlled device, a computer controlled device driver of the selected second computer controlled device according to the generated computer controlled device job, wherein the computer controlled device driver is stored in a location other than the first computer controlled device and is noninterpreted computer code that is independent of the first computer controlled device's operating system and processor;

interpreting the retrieved computer controlled device driver; and controlling, at the first computer controlled device, the second computer controlled device according to the interpreted computer controlled device driver through the operating system of the first computer controlled device and filtered through the translation layer of the first computer controlled device.

32. The method of claim 31, wherein the computer controlled devices are facsimile device.

* * * * *

UNITED STATES PATENT AND TRADEMARK OFFICE
CERTIFICATE OF CORRECTION

| | |
|---|---|
| PATENT NO. | : 6,148,346 |
| DATED | : November 14, 2000 |
| INVENTOR(S) | : Hanson |

Page 1 of 1

It is certified that error appears in the above-identified patent and that said Letters Patent is hereby corrected as shown below:

Title page,
Item [56], References Cited, OTHER PUBLICATIONS, "Xerox Sets...", reference, please delete "BASGD" and insert -- BASED --.

Column 9,
Line 24, after "wherein the" please insert -- retrieved --.
Line 26, please delete "noninterpreted computer code that is".

Column 10,
Line 4, after "wherein the" please insert -- retrieved --.
Line 43, please delete "noninterpreted computer code that is --.

Column 11,
Line 17, after "wherein the", please insert -- retrieved --.

Column 12,
Line 1, please delete "noncompiled computer code that is".
Line 2, please delete "first computer controlled device's" and insert -- host computer's --.
Line 16, please delete "The" and insert -- A --.
Line 31, before "assigned" please insert -- generated computer controlled device job and the --.
Line 35, after "wherein the" please insert -- retrieved --.
Lines 37-38, please delete "noninterpreted computer code that is".

Signed and Sealed this

Twenty-sixth Day of July, 2005

JON W. DUDAS
*Director of the United States Patent and Trademark Office*